United States Patent [19]

Deis et al.

[11] 4,429,613

[45] Feb. 7, 1984

[54] ELECTROMAGNETIC PROJECTILE LAUNCHER WITH AN AUTOMATIC PLASMA FORMATION DEVICE

[75] Inventors: Daniel W. Deis, Churchill Borough; Ian R. McNab, Murrysville Boro, both of Pa.; Joseph L. Smith, Jr., Concord, Mass.

[73] Assignee: Westinghouse Electric Corp., Pittsburgh, Pa.

[21] Appl. No.: 283,582

[22] Filed: Jul. 15, 1981

[51] Int. Cl.³ .............................................. F41F 1/00
[52] U.S. Cl. ............................................ 89/8; 124/3
[58] Field of Search .................... 89/8; 124/3; 310/10

[56] References Cited

U.S. PATENT DOCUMENTS 3,431,816 3/1969 Dale ......................................... 89/8
4,347,463 8/1982 Kemeny et al. ........................ 124/3

OTHER PUBLICATIONS

Proceedings of Impact Fusion Workshop, (7/79), Los Alamos, N.M., pp. 167–168 Hawke.
Megagauss Physics and Technology, (6/79), Wash. D. C., Barber et al., p. 294.
Abstract ARBRL-TR-02267, Plasma Dynamics of the Arc-Driven Rail Gun, 9/80, Powell et al.

Primary Examiner—Sal Cangialosi
Attorney, Agent, or Firm—R. P. Lenart

[57] ABSTRACT

An electromagnetic projectile launching system is provided with an automatic plasma armature formation device. An arc created when a conductive armature breaks contact with a pair of conductive rails is commutated through an aperture in one of the rails to a second pair of conductive rails where the arc is used as a plasma driving armature to propel a projectile.

14 Claims, 5 Drawing Figures

ELECTROMAGNETIC PROJECTILE LAUNCHER WITH AN AUTOMATIC PLASMA FORMATION DEVICE

BACKGROUND AND SUMMARY OF THE INVENTION

This invention relates to electromagnetic projectile launching systems and more particularly to such systems where a plasma (arc) is used to accelerate the projectile.

Electromagnetic projectile launchers are known which comprise a pair of conductive rails, a sliding conductive armature between the rails, a source of high current, and a switch for commutating this current into the rails and through the armature. This places an electromagnetic force on the armature which propels it along the conductive rails. Launchers which utilize metallic armatures have experienced considerable rail damage caused by the sliding armature, particularly where high armature velocities are involved. In these cases, a plasma (arc) armature may be more suitable.

The principal disadvantage to the use of a plasma propelling armature has been the damage that occurs to the breech section of the launcher rails during formation of the plasma. Once the plasma is moving, very little, if any, damage occurs to the rails. Copending application entitled "Electromagnetic Launcher With Self Augmented Rails," Ser. No. 137,059, filed Apr. 3, 1980 by Demeny and Litz, assigned to the present assignee, and now U.S. Pat. No. 4,347,463, discloses a means for establishing an arc for propelling a projectile comprising a shoolting wire or fuse which initiates current flow between the rails, disintegrates, and thereby forms an ionized plasma or arc through which current continues to flow.

The present invention utilizes a switching rail system similar to that disclosed in a copending application entitled "A Swithcing System For High DC Current," Ser. No. 100,302, filed Dec. 4, 1979 by Kemeny, assigned to the present assignee and now abandoned. In a switching rail system, an arc is inherently formed during the commutation of current from the switching rails to the projectile launching rails. The arc is sustained in the present invention and used as the projectile propelling armature. This results in the use of a plasma driving armature which minimizes damage to the rails in the breech area, thereby allowing multi-shot firing without the necessity for system maintenance.

A pair of switching rails is connected through a switch to a source of high DC current. A sliding conductive switch armature is located between the switching rails. When the switch is closed, current flows through the switching rails and switch armature, thereby electromagnetically propelling the switch armature along the rails. As the switch armature passes the ends of the conductive portion of the switching rails, it breaks the circuit, causing an arc to form between the switching rails and the switch armature. An aperture is provided in one of the switching rails near arc location, providing an opening leading to the breech section of a pair of projectile rails. Electromagnetic forces cause the arc to pass through the aperture and into the breech section of the projectile rails, where it serves as the projectile driving armature.

DESCRIPTION OF THE PREFERRED EMBODIMENT

Figure 1:
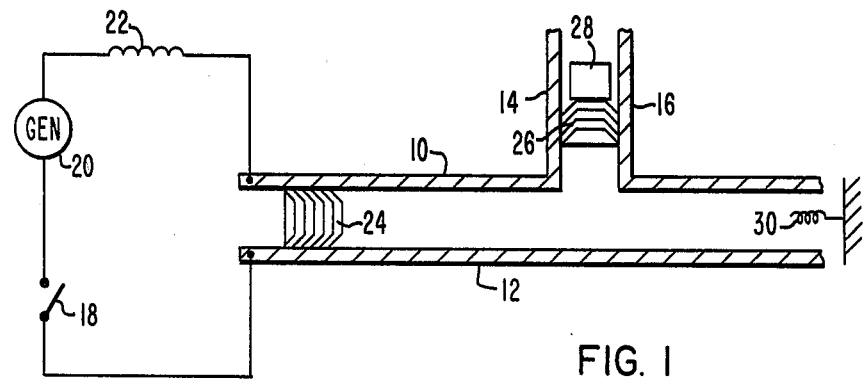
FIG. 1 is a schematic drawing of a prior art switching rail projectile launching system.

Referring now to the drawings in detail, FIG. 1 shows a prior art electromagnetic launcher employing a rail switch for commutating current and comprising a pair of switching rails 10 and 12 electrically connected to projectile rails 14 and 16. A switch 18 is disposed in series with a direct current soource such as homopolar generator 20 and an inductor 22, to provide current to a conductive switch armature 24 which is held in the position shown by a locking device, not shown. At the desired current level, switch armature 24 is released and electromagnetically propelled along switching rails 10 and 12. As switch armature 24 travels past projectile rails 14 and 16, it strikes an arc. The voltage associated with this arc commutates current into projectile armature 26, resulting in the electromagnetic propulsion of projectile armature 26 and projectile 28 along projectile rails 14 and 16. A shock absorbing means 30 is provided to decelerate switch armature 24 at the end of switch rails 10 and 12.

Figure 2:
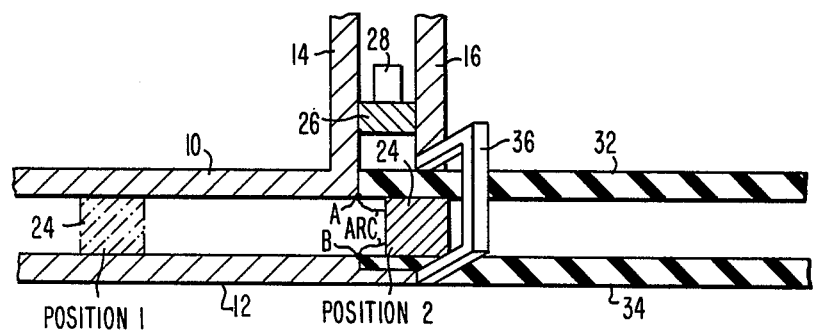
FIG. 2 shows an embodiment of the junction between the switching rails and the projectile rails of the FIG. 1 launching system.

FIG. 2 illustrates the rail switch current commutation concept for a prior art projectile launcher utilizing a metallic projectile armature. Switch armature 24 is held at position 1 until a desired level of current is flowing through it. At that time, switch armature 24 is released and it travels to the right. When it enters insulator rails 32 and 34, two arcs are formed at points A and B as the trailing edge of the armature passes these points. The resulting arc voltage commutates the current into projectile armature 26 and shunt 36. This is illustrated with switch armature 24 in position 2 in FIG. 2.

As switch armature 24 travels farther between insulated rails 32 and 34, the arcs will be extinguished and current through the armature goes to zero. Current will then flow through switch rail 10; the section of projectile rail 14 between projectile armature 26 and switch rail 10; projectile armature 26; the section of projectile rail 16 between projectile armature 26 and shunt 36; shunt 36; and switch rail 12. This will electromagnetically propel projectile armature 26 and projectile 28 along projectile rails 14 and 16.

Prior to switching, projectile armature 26 is electrically connected in parallel with switch armature 24. This can result in premature projectile armature movement due to current flowing in the projectile armature 26 before switching occurs. Current flow in the projectile armature prior to switching can be inhibited by making the shunt or a short section of the projectile rails resistive. However, the addition of resistive elements reduces launcher efficiency.

Figure 3:
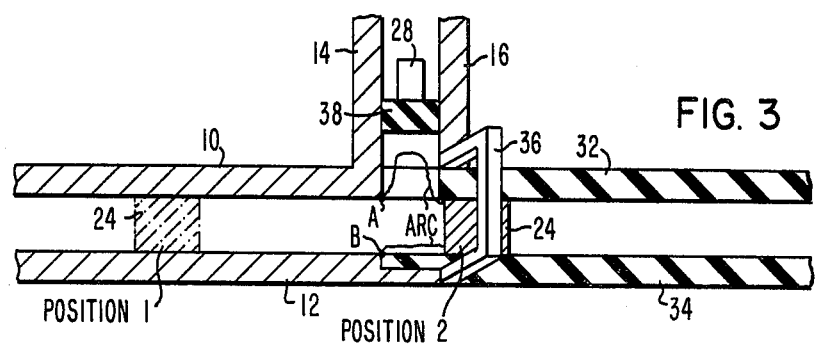
FIG. 3 shows an embodiment of a junction between switch rails and projectile rails in accordance with the present invention.

The present invention provides a unique method of generating a plasma armature between projectile rails 14 and 16 by using the arc formed at point A in FIG. 2 as the source for a plasma armature which will accelerate the projectile. FIG. 3 illustrates the rail section of an electromagnetic launcher built in accordance with the present invention. This launcher uses a basic configuration similar to the launcher of FIG. 2 except that no projectile armature is shown. Conductive switch armature 24 is slidably disposed between two parallel conductive switching rails 10 and 12. Two conductive projectile rails 14 and 16 are located at one end of switching rails 10 and 12 with projectile rail 14 being directly connected to switching rail 10 and projectile rail 16 being electrically connected to switching rail 12 through shunt 36. Insulating rails 32 and 34 are disposed adjacent switching rails 10 and 12. Means for commutating an arc is provided by an aperture 40 which has been made in insulating rail 32 so that the arc formed between point A and switch armature 24 can enter the gap between projectile rails 14 and 16. In addition, an insulating ablative sabot 38 is disposed between the arc and projectile 28 to move the projectile ahead of the arc and propel it from one end of projectile rails 14 and 16 to the other end.

When the projectile launching system of FIG. 3 is operated, switch armature 24 is held at position 1 until a desired level of current is flowing through it. At that time, switch armature 24 is released and it travels to the right. When it enters insulating rails 32 and 34, two arcs are formed at points A and B as the trailing edge of the armature passes these points. Electromagnetic forces associated with these arcs force the arc connected to point A through an aperture in insulated rail 32 at the breech of projectile rails 14 and 16 and accelerate the arc along the projectile rails in a manner identical to the acceleration of the prior art metallic projectile armature. Insulating ablative sabot 38 travels along the projectile rails 14 and 16 between the arc and the projectile 28.

Figure 4:
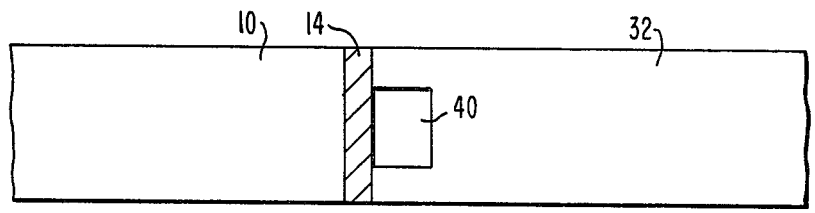
FIG. 4 shows an embodiment of a rail aperture in accordance with the present invention.

FIG. 4 is a front view of switching rails 10 and 32 from the launcher in FIG. 3, showing the location of aperture 40 through which the arc passes from the switching rails to the projectile rail breech.

Figure 5:
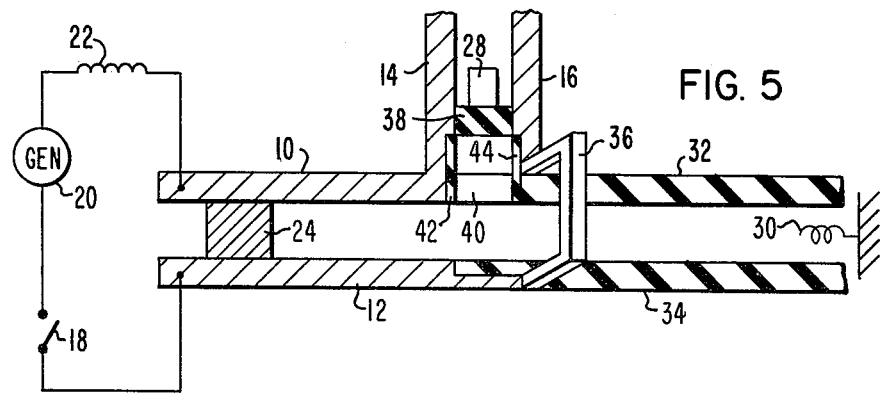
FIG. 5 shows an embodiment of an electromagnetic projectile launching system in accordance with the present invention.

FIG. 5 shows an embodiment of an electromagnetic projectile launcher in accordance with the present invention. The series connection of a switch 18, direct current generator 20, and inductor 22 is shown as a high current source. It should be apparent that other sources of direct current which are known in the art could also be used. When switch 18 is closed, direct current will flow, charging inductor 22. When the desired current is reached, switch armature 24 is released and current is commutated to projectile rails as described for FIG. 3. Once switch armature 24 passes projectile rails 14 and 16 and current has been commutated to the projectile rails, switch armature 24 is no longer accelerated by electromagnetic forces and it decelerates between insulator rails 32 and 34. Shock absorber 30 is shown to provide additional deceleration for switch armature 24 if it has not stopped before reaching the ends of insulator rails 32 and 34.

When the projectile driving arc first enters the breech of projectile rails 14 and 16, it will be travelling at a relatively slow velocity. In order to minimize damage to the projectile rails caused by the slow moving arc, arc-resistant inserts 42 and 44 have been installed in the breech section of projectile rails 14 and 16 respectively.

The present invention provides for the reproducible, automatic formation of a plasma armature during the switching process while minimizing damage to system components and thus should be ideally suited for high velocity, multi-shot, rapid firing launchers. Since the plasma mass is very low compared to prior art metallic armatures, system efficiency based on targeted kinetic energy as a fraction of input electrical energy will be improved. Prior to switching, the projectile rails are an open circuit. Therefore, there is no need to introduce resistance in the shunt or elsewhere to eliminate premature current flow in the projectile armature.

I claim:

1. An electromagnetic projectile launching system comprising:
    a first pair of conducting rails;
    a conductive armature slidably disposed between said first pair of rails;
    a source of current;
    means for connecting said current to said first pair of rails, thereby propelling said armature along said first pair of rails and striking an arc when said armature breaks contact with said first pair of rails;
    a second pair of conducting rails located adjacent said first pair of rails at the point where said arc is formed, and electrically connected to said first pair of rails; and
    means for transferring, without extinguishing, said arc into a gap between said second pair of conductors, where said arc acts as a plasma armature for propelling a projectile.

2. An electromagnetic projectile launching system as recited in claim 1, wherein said means for transferring said arc is an aperture at one end of one of said first pair of rails through which said arc passes prior to entering said second pair of rails.

3. An electromagnetic projectile launching system as recited in claim 1, wherein said source of current comprises;
    an inductive energy storage means; and
    a direct current generator connected in series with said inductive energy storage means.

4. An electromagnetic projectile launching system as recited in claim 3, wherein said inductive energy storage means is an induction coil.

5. An electromagnetic projectile launching system as recited in claim 3, wherein said direct current generator is a homopolar generator.

6. An electromagnetic projectile launching system as recited in claim 1, wherein said means for connecting said current to said first pair of rails is a switch connected in series with said source of current and said first pair of rails.

7. An electromagnetic projectile launching system as recited in claim 1, further comprising means for decelerating said conductive armature.

8. An electromagnetic projectile launching system as recited in claim 7, wherein said decelerating means comprises a pair of insulator rails adjoining said first pair of conductive rails such that said conductive armature travels between said insulator rails after leaving said first pair of conductive rails.

9. An electromagnetic projectile launching system as recited in claim 8, wherein said means for transferring said arc is an aperture at one end of one of said insulator rails, located adjacent to one of said first pair of conducting rails.

10. An electromagnetic projectile launching system as recited in claim 1, further comprising an ablative insert slidably disposed between said second pair of conducting rails, to propel a projectile in front of said arc.

11. An electromagnetic projectile launching system as recited in claim 1, further comprising means to limit damage caused by said arc in said second pair of conducting rails.

12. An electromagnetic projectile launching system as recited in claim 11, wherein said means for limiting damage caused by said arc in said second pair of conducting rails is a pair of arc resistant inserts, each located at one end of one of said second pair of conductive rails adjacent said means for transferring said arc.

13. An automatic plasma armature formation device for electromagnetic launchers, comprising:
- a first pair of conducting rails;
- a conductive armature slidably disposed between said first pair of conductive rails, wherein said armature is capable of being propelled along said first pair of rails by electromagnetic forces resulting from current flow therethrough and thereby forming an arc as said armature breaks electrical contact with said first pair of rails at said first end;
- a second pair of conducting rails having one end located adjacent said first end of said first pair of rails and electrically connected to said first pair of rails; and
- an aperture adjacent to said first end of one of said first pair of conducting rails through which an arc generated adjacent to said first end of said first pair of rails can pass, to enter a gap between said second pair of conductive rails.

14. An automatic plasma armature formation device for electromagnetic launchers as recited in claim 13, further comprising a pair of insulator rails adjoining said first pair of conductive rails at said first end thereof such that said conductive armature travels between said insulator rails after leaving said first pair of conductive rails, wherein said aperture passes through one of said pair of insulator rails.

* * * * *